(12) United States Patent
Lessner et al.

(10) Patent No.: US 6,391,379 B1
(45) Date of Patent: *May 21, 2002

(54) PROCESS OF PREPARING A SOLID ELECTROLYTIC CAPACITOR CONTAINING A CONDUCTIVE POLYMER COUNTER ELECTRODE

(75) Inventors: Philip M. Lessner, Simpsonville; Tsung-Yuan Su; Brian J. Melody, both of Greer; John T. Kinard, Simpsonville; Veeriya Rajasekaran, Greenville, all of SC (US)

(73) Assignee: Kemet Electronics Corporation, Greenville, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,486

(22) Filed: Sep. 4, 1998

(51) Int. Cl.[7] .................................................. B05D 5/12
(52) U.S. Cl. ........................................ 427/80; 29/25.03
(58) Field of Search .................... 427/79, 80, 430.1, 427/435; 29/25.03

(56) References Cited

U.S. PATENT DOCUMENTS

| | | | |
|---|---|---|---|
| 4,310,566 A | * | 1/1982 | McGrath .................... 427/80 |
| 5,455,736 A | * | 10/1995 | Nishiyama et al. ......... 361/525 |
| 5,457,862 A | * | 10/1995 | Sakata et al. .............. 29/25.03 |
| 5,470,505 A | | 11/1995 | Smith et al. |
| 5,487,847 A | | 1/1996 | Mahabadi et al. |
| 5,543,438 A | | 8/1996 | Shibayama et al. |
| 5,616,274 A | * | 4/1997 | Kanbara et al. ............ 252/62.2 |
| 5,622,668 A | * | 4/1997 | Thomas et al. .......... 264/289.3 |
| 5,624,605 A | * | 4/1997 | Cao et al. .................... 252/500 |
| 5,729,428 A | | 3/1998 | Sakata et al. |
| 5,951,840 A | * | 9/1999 | Fukaumi et al. ............ 205/173 |

FOREIGN PATENT DOCUMENTS

| | | | |
|---|---|---|---|
| JP | 22515 | * | 1/1991 |
| JP | 03 022515 | | 1/1991 |

* cited by examiner

Primary Examiner—Brian K. Talbot
(74) Attorney, Agent, or Firm—Banner & Witcoff, Ltd.

(57) ABSTRACT

The present invention relates to a method for making a solid electrolytic capacitor having a low equivalent series resistance by impregnating a porous capacitor pellet with conductive polymer. An oxidized pellet is dipped in a high concentration conductive polymer solution to deposit the polymer in doped (conductive) form. The solution also contains a crosslinking agent to prevent redissolution of the polymer when the pellet is re-dipped. After dipping, the solvent in the polymer solution is evaporated and a conductive film formed. In order to evaporate the solvent quickly, the solvent should have a boiling point of 80–220° C. and preferably a boiling point of 100–150° C. The conductive polymer film has a low resistivity (less than 1 ohm-cm, preferably less than 0.2 ohm-cm).

14 Claims, No Drawings

PROCESS OF PREPARING A SOLID ELECTROLYTIC CAPACITOR CONTAINING A CONDUCTIVE POLYMER COUNTER ELECTRODE

FIELD OF THE INVENTION

This invention relates to solid electrolytic capacitors and methods for fabricating the same, and more particularly to solid electrolytic capacitors in which conductive polymers are used as solid electrolytes and which have a low equivalent series resistance.

BACKGROUND OF THE INVENTION

A solid state electrolytic capacitor is made from a porous pellet of sintered tantalum powder, a dielectric tantalum oxide layer formed on the surface of the sintered tantalum powder, a solid-state conductor impregnated into the volume of the pellet, and external connections such as silver paint, etc. The tantalum forms the positive electrode of the capacitor, and the solid-state conductor forms the negative electrode (also called the cathode or counter-electrode).

Manganese dioxide has been utilized as the cathode of choice for solid tantalum capacitors since the commercial introduction of this style of capacitor in the early 1950's. A key property of manganese dioxide is its self-healing ability. At defective portions of the dielectric film, the manganese dioxide becomes non-conductive. This is due to the manganese dioxide transforming to a lower manganese oxide because of joule heating at the defect site. This mechanism allows capacitors with low leakage currents to be produced. It also allows small dielectric defects that occur during manufacture and use to be isolated. However, if the dielectric defect is too large, the dielectric can crack. Manganese dioxide is a powerful oxidizing agent. When it comes in direct contact with tantalum through a crack in the oxide, the capacitor can ignite, leading to destruction of the capacitor and possible destruction of other components in the circuit. It is desirable to replace the manganese dioxide with a solid-state conductor that does not cause the tantalum to ignite while maintaining the self-healing ability.

The use of tantalum capacitors in high frequency circuits has become more important. This has led to the need for tantalum capacitors having low equivalent series resistance (ESR). The best manganese dioxide has a resistivity of 0.5 to 10 ohm-cm. It is desirable to replace the manganese dioxide with a solid-state conductor metals and oxides do not have a self-healing ability and thus are not suitable for solid-state tantalum capacitors.

Conductive polymers such as polypyrroles, polyanilines, and polythiophenes have resistivities 10 to 100 times less than that of manganese dioxide. Since they are much less powerful oxidizing agents than manganese dioxide, these materials do not cause the capacitor to ignite upon failure. Polypyrrole was shown to have a self-healing mechanism (Harada, NEC Technical Journal, 1996). Due to favorable properties of conductive polymer compounds, these compounds are being investigated as possible replacement materials for manganese dioxide in solid-state tantalum capacitors.

Three methods have been used to deposit the conductive polymer in the porous tantalum pellet:
1. Chemical oxidative polymerization;
2. Electrolytic oxidative polymerization; and
3. Deposition of a polymer from solution followed by oxidation and/or doping.

In chemical oxidative polymerization, a monomer, an oxidizing agent, and a dopant are reacted inside the porous pellet to form the conductive polymer. Monomers include pyrrole, aniline, thiophene, and various derivatives of these compounds. The oxidizing agent can be either an anion or a cation. Typical anion oxidizers are persulfate, chromate, and permanganate. Typical cations are $Fe(III)$ and $Ce(IV)$. The best dopants are anions of strong acids such as perchlorate, toluenesulfonate, dodecylbenzenesulfonate, etc. The reaction between monomer, oxidizing agent, and dopant can take place in a solvent such as water, an alcohol, a nitrile, or an ether.

Several methods have been used to get the monomer, oxidizing agent, and dopant into the porous pellet and carry out the conversion to conductive polymer. In one method, the pellet is first dipped in a solution of the oxidizing agent and dopant, dried, and then dipped in a solution of the monomer. After the reaction is carried out, the pellet is washed and then the process is repeated until the desired amount of polymer is deposited in the pellet. In this method, it is difficult to control the morphology of the final polymer. It is also difficult to control the exact reaction stoichiometry between the monomer and the oxidizing agent. Control of this stoichiometry is critical to achieve the highest conductivity polymer (Satoh et al., Synthetic Metals, 1994). Cross contamination of the dipping solutions is a problem. Since the pellet must be dipped twice for each polymerization, the number of process steps is greatly increased. The excess reactants and the reduced form of the oxidizing agent need to be washed out of the part. This adds even more process steps and complexity to the process.

In a related method, the sequence is reversed so that the pellet is dipped in the monomer solution first and the solvent is evaporated away. The pellet is then dipped in the oxidizing agent/dopant solution and the reaction is carried out. This method suffers from all the disadvantages of the previous method. In addition, some monomer may be lost in the solvent evaporation step.

In yet another method, all components are mixed together and the pellet is dipped in the combined solution. This method reduces the number of dips and allows more precise control over the reaction stoichiometry. However, the monomer and oxidizing agent can react in the dipping bath, causing premature polymerization and loss of reactants, adding some cost and complexity to the process. This problem is especially significant with pyrrole monomer and $Fe(III)$ oxidizing agents. To overcome this problem to some extent, the dipping bath can be kept at cryogenic temperature (Nishiyama et al., U.S. Pat. No. 5,455,736). However, use of cryogenic temperatures adds considerable equipment and operational complexity to the process. The pyrrole/$Fe(III)$ can be replaced with a monomer/oxidizing agent combination that is less reactive, such as 3,4-ethylenedioxythiophene and an $Fe(III)$ salt of an organic acid (Jonas et al., U.S. Pat. No. 4,910,645).

In electrolytic oxidative polymerization, the monomer is oxidized to polymer at an electrode and the dopant is incorporated from the electrolyte. This polymerization method produces high conductivity polymer films. There is no chemical oxidizer to wash out of the film after polymerization.

Direct electrolytic oxidation of monomer to polymer on the tantalum anode is difficult because of the high resistance dielectric oxide layer. Various methods have been proposed to circumvent this problem. One method is to form the polymer on the tantalum and then to form the oxide layer (Saiki et al., U.S. Pat. No. 5,135,618). In another method, the polymer and the oxide layer are formed at the same time (Saiki et al., European Patent Application 0 501 805 A1). However, the electrolytes best suited for depositing conductive polymer and tantalum oxide films are quite different; therefore, these methods produce neither an optimum polymer nor an optimum oxide.

Another method is to deposit a thin film of conductive material by chemical methods, followed by contacting this layer with an electrode to carry out the electrolytic oxidative polymerization. Manganese dioxide prepared by pyrolysis of manganese nitrate (Tsuchiya et al., U.S. Pat. No. 4,943,892), manganese dioxide prepared by pyrolysis of permanganate (Kudoh et al., J. Power Sources, 1996), and conductive polymer prepared by chemical oxidative polymerization (Yamamoto et al., Electronics and Communications in Japan, 1993) have been used for this thin layer. Contacting this thin layer of conductive material with an auxiliary electrode is difficult to achieve in practice. Thus, Tsuchiya et al. propose bridging the anode lead to the conductive layer. This bridging layer must be removed after the polymer has been deposited by electrolytic oxidative polymerization. A complicated series of insulating washers under the bridging layer is used to accomplish this. Kojima et al. (U.S. Pat. No. 5,071,521) propose contacting the thin conductive layer with an auxiliary electrode. Use of an auxiliary electrode greatly increases process complexity, especially with sintered pellet-type anodes where an individual electrode must be provided for each individual anode. Contacting the thin conductive layer with an auxiliary electrode can cause damage to the tantalum oxide layer.

In principle, direct deposition of polymer from solution involves dipping the capacitor in the polymer solution, then evaporating the solvent away to form a conductive film. This operation would be repeated several times to deposit the required amount of polymer in the pellet. This direct deposition strategy would reduce the number of process steps compared to the chemical oxidative polymerization approach and would eliminate the cumbersome auxiliary electrodes used in the electrolytic oxidative polymerization approach. However, capacitance efficiency is poor with this process, due to the difficulty of impregnating small pores with a liquid containing a dispersed solid phase.

Furthermore, technical limitations on conductive polymer solutions prevent this ideal process from being achieved in practice. For example, polyaniline is soluble in N-methyl-2-pyrrolidone ("NMP") in the emereldine base form (PANI-EB), but not in the doped form. A solution of PANI-EB is impregnated into a pellet followed by solvent evaporation to leave a low-conductivity PANI-EB film. The pellet must then be further soaked in a solution of a dopant to change the film into the conducting emereldine salt (ES) form. This doping reaction takes a considerable amount of time, and the excess dopant must be washed from the pellet. In addition, PANI-EB solutions are very viscous in concentrations above 5 wt % and tend to gel with standing. Thus, Sakata et al. (U.S. Pat. No. 5,457,862) state that PANI-EB in NMP can be used to coat the outside of the porous pellet and is not suitable for internal impregnation. Even after doping, the resistivities of PANI-ES prepared using this method are only about 1 ohm-cm.

To avoid the gelling problem, Abe et al. (U.S. Pat. No. 5,436,796) use a solution of polyaniline in the leuco emereldine base form (PANI-LEB). This allows higher concentrations of PANI to be used without the problems of gelling, and the ultimate film resistivity is lower. However, in order to be converted into the conducting PANI-ES form, the PANI-LEB films must be oxidized and doped inside the capacitor pellet. The oxidizing/dopant reaction takes a considerable amount of time, and both the excess dopant and excess oxidizer mush be washed from the pellet.

Other prior art efforts include Cao et al. (U.S. Pat. No. 5,624,605) who teach the use of functionalized protonic acids to induce processibility of electrically conductive substituted or unsubstituted polyanilines with average molecular weight greater than 10,000 Daltons. Cao et al. also disclose the use of these functionalized protonic acids to induce solubility of polyanilines in organic liquids. The functionalized protonic acid solutes are well known as dopants and are defined as acids that protonate polyaniline to form a miscible or soluble complex with conductivity approximately equal to or greater than $10^{-3}$ S/cm. The preferred functionalized protonic acid is dodecylbenzene sulfonic acid because as the degree of protonation increases, the solubility also increases. Cao et al. combine one or more substituted or unsubstituted polyanilines, an organic substrate phase, and one or more functionalized protonic acid solutes with a compatible counter ion to produce electrically conductive, co-continuous polymeric solutions that contain around 1 wt % of monomer.

Cao et al. teach that the substituted or unsubstituted polyanilines in protonated form can be dissolved in organic liquids and, due to their high molecular weight, coated onto surfaces and spun into fibers without binders. The organic substrate phase is either an organic liquid, an organic solid or semisolid, or the protonic acid. These liquids, solids, semi-solids or acids can be substituted or unsubstituted aromatic hydrocarbons, such as xylene, higher alkanes, cyclic alkanes, halogenated alkanes, higher alcohols, higher ketones, heterocyclics, or perfluorinated hydrocarbons.

One limitation of these prior art solutions (or dispersions) has been the low concentration of doped polymer that can be dissolved. For example, one commercially available dispersion of polyaniline contains only 0.5 wt % doped polymer (ORMECON Dispersion 900132). Likewise, a commercially available dispersion of poly-(3,4-ethylenedioxythiophene) contains only 1.3 wt % doped polymer (Bayer, Baytron P). The use of such low concentration dispersions would require that the capacitor be dipped many times, resulting in a low process throughput.

Another limitation on prior art solutions has been the redissolution of the deposited polymer film in the dipping solution. Smith et al. (U.S. Pat. No. 5,470,505) describe a solution of up to 20 wt % doped polyaniline in concentrated sulfuric acid. However, they state that the deposited polyaniline films are re-soluble in the sulfuric acid solution. Even if the films do not redissolve, the solvent will soften the film on re-dipping, leading to separation of the film from the tantalum oxide dielectric. Kinlen (U.S. Pat. No. 5,567,356) describes polyaniline salts soluble in organic solvents (sold under the Monsanto trade name XICP-OS01). Without modification, these salts also redissolve in solvent.

SUMMARY OF THE INVENTION

It is therefore an object of the present invention to deposit a conductive polymer in a porous capacitor pellet directly from solution in the final conductive form. This eliminates secondary doping, oxidation, and washing steps, thereby reducing the process complexity. In the past, technical limitations of these doped polymer solutions have made them unsuitable for depositing polymer in a capacitor.

It is another object of the present invention to deposit a solution containing a high concentration of conductive polymer in a porous capacitor pellet. The high concentration solution enables a conductive polymer film to be applied in a fewer number of dipping steps.

It is a further object of the present invention to deposit a conductive polymer film in a porous capacitor such that the polymer film does not redissolve or does not substantially redissolve during subsequent dipping steps.

It is yet a further object of the present invention to deposit a conductive polymer film in a porous capacitor pellet such that the film has a conductivity of greater than 5 S/cm and a long range of thermal stability.

One aspect of the present invention involves a process for forming a solid electrolytic capacitor having a conductive polymer counter electrode, the process comprising:

(a) providing an oxidized porous capacitor pellet;

(b) dipping the pellet in a solution comprising a solvent, a conductive polymer, and a crosslinking agent; and (c) applying heat to the pellet so as to evaporate the solvent and crosslink the polymer, thereby forming a conductive polymer film.

Another aspect of the present invention involves additionally:

(d) re-dipping the pellet in the solution of step (b); and (e) applying heat to the pellet so as to evaporate the solvent;

wherein the crosslinked polymer is substantially insoluble in the solvent.

According to the present invention, a high concentration polymer solution, preferably having a concentration of at least 5 wt % polymer, more preferably at least about 8 wt % polymer, most preferably from about 10 wt % to about 30 wt % polymer, effectively and rapidly impregnates a porous capacitor pellet. Upon evaporation of the solvent, the polymer is deposited in the doped (conductive) form. To prevent redissolution of the polymer in the dipping solution, the polymer film is rendered insoluble in the original polymer solution. This can be accomplished by including an agent that crosslinks the polymer during the solvent evaporation stage. The conductive polymer film which is formed has a resistivity of less than 1 ohm-cm and preferably less than 0.2 ohm-cm. For ease of handling in an industrial process, it is desirable that the solvents have boiling points in the range of 80 to 220° C., most preferably in the range of 100 to 150° C. In a preferred embodiment, a mixed solvent of xylene and propylene glycol propyl ether is employed.

The process of the present invention realizes a substantial reduction in the number of process steps through the use of a high polymer concentration dipping solution and by preventing redissolution of the deposited polymer film. The invention further eliminates the need for additional doping, oxidation and washing steps by depositing a polymer film in the doped form, and eliminates the need for auxiliary electrodes as is required in electrolytic oxidative polymerization. The deposited polymer film is highly conductive, i.e., more than 5 S/cm. In addition, the conductive polymer solution has relatively no pot life limitations.

DETAILED DESCRIPTION OF THE INVENTION

A porous pellet is prepared by pressing charged powder and sintering to form a porous body. Preparation of porous pellets is well known in the art, for example as taught by U.S. Pat. No. 5,729,428 to Sakata et al., incorporated by reference herein in its entirety. The pellet may be made from tantalum, niobium, aluminum, hafnium, zirconium, titanium, or alloys of these elements, tantalum being the preferred material. An oxide film is then formed using a phosphoric acid or phosphate-containing electrolyte solution with a voltage of from about 14 V to about 150 V being applied. The formation voltage ranges from 2.5 to 4.5 times the rated voltage of the part and most preferably from 3 to 3.5 times the rated voltage of the part. The porous pellet can be of any size that is suitable for producing a surface mount or leaded-style tantalum capacitor. The porous pellet body typically has a thickness of 0.5 mm to 3 mm, a width of 0.9 mm to 5 mm, and a length of 1 mm to 5.5 mm.

A conductive polymer solution is prepared containing a conductive polymer and a suitable crosslinking agent. The concentration of the conductive polymer in the solvent is preferably at least 5 wt %, more preferably at least about 8 wt %, and most preferably from about 10 wt % to about 30 wt %. Various conductive polymers may be used in accordance with the invention, such as polyaniline, polythiophene, polypyrrole, and derivatives of these materials. The preferred conductive polymer is polyaniline. Conductive polymers are well known in the art, for example as taught by U.S. Pat. No. 5,624,605 to Cao et al., incorporated by reference herein in its entirety.

The conductive polymer is dissolved in a solvent, preferably a solvent having a boiling point in the range of 80 to 220° C., most preferably in the range of 100 to 150° C. The selection of a suitable solvent for a particular conductive polymer is well within the level of skill in the art. In a preferred embodiment of the invention, a mixed solvent of xylene and propylene glycol propyl ether containing a crosslinking agent (trade name Monsanto XICP-OS06N) is used to dissolve polyaniline.

The particular crosslinking agent used is not critical to the invention. For example, Jonas et al. (DE 195 07 413 A1) teach the use of glycidoxypropyltrimethoxysilane to crosslink poly (3,4-ethylenedioxythiophene) doped with poly (styrene sulfonic acid). Here the glycidoxy functionality on the silane reacts with the excess sulfonic acid groups in the dopant to crosslink the polymer and make it substantially water-insoluble after curing. The crosslinking agent is chosen to react either with the polymer chain or with the dopant molecules. The crosslinking agent can have a concentration ranging from less than 0.1% by weight to greater than 10% by weight, depending on the degree of crosslinking required. The degree of crosslinking is set high enough so that the polymer remains insoluble after curing but low enough so that the conductivity of the final polymer film is not degraded. The selection of a suitable crosslinking agent for a particular conductive polymer is well within the level of skill in the art.

The porous pellet is then dipped in the conductive polymer solution. The pellet is removed from the solution and heated to a temperature of from about 100° C. to about 180° C., preferably about 160° C. Heat is applied until such time that the solvent has evaporated and crosslinking of the polymer has been completed, which normally is about fifteen minutes. Since the polymer film is in the conductive form, an additional step of doping is not needed.

The steps of dipping, solvent removal and crosslinking are repeated as necessary to build up the conductive polymer film to yield a capacitor having desired electrical characteristics. Crosslinking of the polymer prevents redissolution or substantial redissolution of the polymer in the dipping solution. The conductive polymer film which is formed has a resistivity of less than 1 ohm-cm and preferably less than 0.2 ohm-cm.

EXAMPLES

The following illustrative examples are provided for a better understanding of the invention. These examples are illustrative of preferred aspects of the invention and are not intended to limit the scope of the invention.

Example 1

A drop of 10% polyaniline dissolved in a solvent of xylene and propylene glycol propyl ether containing a cross-linking agent (Monsanto XICP-OS06N) was placed between two gold electrodes on a mylar substrate. The material was cured for 15 minutes at 160° C. After curing, a green film of polyaniline salt was formed between the electrodes. The measured resistance of this film was 7.2 ohms.

The entire assembly was soaked in xylene for 30 minutes. No lifting or dissolution oft he film was observed. The assembly was dried at 160° C. and the resistance was remeasured. The resistance was 6.5 ohms.

The assembly was soaked again in xylene as above and dried as above. The resistance was again 6.5 ohms.

Comparative Example 1

A drop of polyaniline in xylene not containing cross-linking agent (Monsanto XICP-OS01) was deposited on a mylar substrate. The material was heated for 15 minutes at 160° C. to drive off the solvent. A green film of polyaniline salt was formed between the electrodes. The assembly was soaked in xylene. After a few minutes, the film had lifted from the surface and had begun to redissolve in the xylene solvent.

Example 2

Tantalum powder of charge 26,000 CV/g was pressed into a pellet and sintered to form a porous body of dimensions 0.81 mm thick, 2.92 mm wide, and 3.94 mm long. An oxide film was then formed in a phosphoric acid electrolyte at 28 volts. The pellet was dipped in a solution of 10 wt % polyaniline dissolved in a solvent of xylene and propylene glycol propyl ether containing a crosslinking agent (Monsanto OS06N). After the pellet had been removed from the dipping solution, it was heated to 160° C. for 15 minutes to remove the solvents and to crosslink the film. The process of dipping, solvent removal, and crosslinking was repeated seven more times. To form a robust outside layer, the capacitor was dipped twice in a solution that contained 30 wt % polyaniline solid and cured, also at 160° C. Silver paint was then applied and cured. The capacitance of the pellet was 40 microfarads, the 120 Hz DF (dissipation factor) was 2.5%, and the ESR (equivalent series resistance) was 0.07 ohms.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process for forming a solid electrolytic capacitor having a conductive polymer counter electrode, the process comprising:
   (a) providing an oxidized porous capacitor pellet; and forming a doped polymer film by
   (b) dipping the pellet in a solution comprising a solvent, a conductive polymer, and a crosslinking agent; and
   (c) applying heat to the pellet so as to evaporate the solvent and crosslink the conductive polymer, thereby forming the doped polymer film.

2. The process of claim 1 wherein the porous capacitor pellet is made from tantalum.

3. The process of claim 1 wherein the porous capacitor pellet is made from a material selected from the group consisting of niobium, aluminum, hafnium, zirconium, titanium, and alloys thereof.

4. The process of claim 1 further comprising:
   (d) re-dipping the pellet in the solution of step (b); and
   (e) applying heat to the pellet so as to evaporate the solvent;
   wherein the crosslinked polymer is substantially insoluble in the solvent.

5. The process of claim 1 wherein the conductive polymer is selected from the group consisting of polyaniline, polythiophene, polypyrrole, and derivatives thereof.

6. The process of claim 1 wherein the conductive polymer is polyaniline.

7. The process of claim 1 wherein the solvent has a boiling point of from about 80° C. to about 220° C.

8. The process of claim 1 wherein the solvent has a boiling point of from about 100° C. to about 150° C.

9. The process of claim 1 wherein the solvent comprises a mixture of xylene and propylene glycol propyl ether.

10. The process of claim 1 wherein the film formed in step (c) has a conductivity of more than 5 S/cm.

11. The process of claim 1 wherein the solution comprises a polymer in a concentration of at least 5% by weight.

12. The process of claim 1 wherein the solution comprises a polymer in a concentration of at least about 8% by weight.

13. The process of claim 1 wherein the solution comprises a polymer in a concentration of at least about 10% by weight.

14. The process of claim 1 wherein the solution comprises a polymer in a concentration of between about 10% and 30% by weight.

* * * * *